United States Patent Office 3,362,803
Patented Jan. 9, 1968

3,362,803
METHOD OF MAKING GLASS OR
CERAMIC COVERED WIRES
Walter Dannöhl, Kelkheim-Munster, and Joachim Nixdorf, Frankfurt am Main, Germany, assignors to The Federal Republic of Germany as represented by the Secretary of Defense, Bonn, Germany
Filed Feb. 25, 1965, Ser. No. 435,374
Claims priority, application Germany, Mar. 5, 1964, B 75,740
2 Claims. (Cl. 65—13)

ABSTRACT OF THE DISCLOSURE

A glass or ceramic covered wire is prepared by drawing a glass or ceramic capillary which contains a metal wire first through a zone of radiating heat and then through a zone where the metal wire is molten by high frequency and softens the glass or ceramic so as to become enveloped, on cooling, by the solidified glass or ceramic.

---

Figure 1:
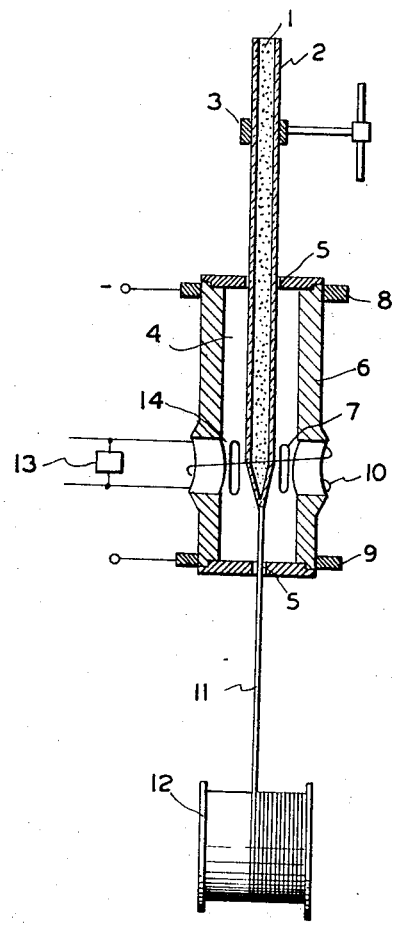

This invention relates to a heating device suitable in connection with the manufacture of glass or ceramics enveloped fine wires by drawing glass or ceramic capillary or other tubes which are filled with a high melting metal.

Such enveloped fine wires are used as electric conductors for miniaturized circuits, microthermocouples, and other purposes. Without the envelope, such wires are useful for the manufacture of ultrafine fabrics, screens, and the like.

It is known to draw such wires which are provided with a glass insulating layer, from metal-filled glass capillary tubes whereby the melting point of the metal must be below, or at the lower limit of, the softening range of the glass. The heat required for melting the metal and for softening the glass has been produced in some plants by inductive heating of the metal core. In other plants, a great number of very fine oxygen burners has been used. Already in the first reports on the drawing of glass covered wires, it had been proposed to place the starting material in the bore of a copper block heated by a gas flame. High melting metals and alloys, for instance niobium and niobium alloys, have a melting point above 2000° C., which is above the softening range of the known glasses and those ceramics which could be used for this purpose. Therefore, it has not been possible to heat such high melting metals in glass or ceramic capillary tubes so far as to allow drawing of such metals to glass covered fine wires.

It is a principal object of our invention to provide a method and means for heating high melting metals in glass or ceramic tubes so far that they are readily drawn to wires.

According to the invention, such drawing of high melting glass or ceramic covered wire is made possible by using a heating device in which a radiating heating zone and an inductive heating zone overlap.

A device suitable for such a heating procedure comprises an electrically heated tube of graphite, carbon, silicon carbide, or the like, whose wall is provided with perforations or windows, and an induction coil surrounding said tube in the area of said perforations or windows.

In another embodiment of the invention, a cylinder of diamagnetic material surrounded by an induction coil joins the electrically heated resistance tube.

Still further objects and advantages of the invention will be apparent from the following detailed description and explanation of specified illustrative embodiments and examples of the invention, including a particular form of apparatus and a mode of operating the same, as shown in the accompanying drawings.

Figure 2:
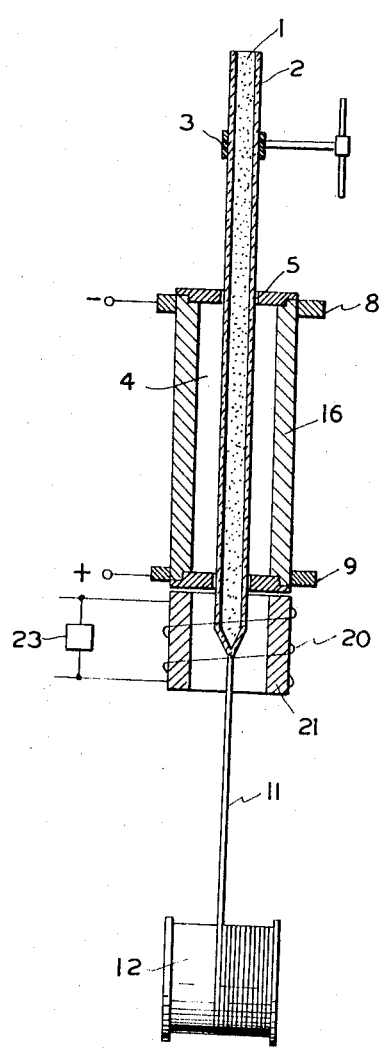

In the drawings,

FIGURE 1 is a longitudinal sectional view of one form of heating apparatus according to the invention, and FIGURE 2 is a similar view of another embodiment of the invention.

In the apparatus shown in FIGURE 1, a glass capillary tube 2 containing a metal core 1 is gripped in a supporting clamp 3 and introduced from above into a carbon tube 4. Said tube is covered at both ends, leaving only passages 5. In the lower part of the tube 4, the wall 6 is provided at a certain level with slots 7 which extend parallel to the axis of the tube. Suitable leads 8, 9 are connected to a source of electric current. A mechanism (not shown) is provided to feed the capillary downwardly as required by the speed of drawing.

At the level of the slots 7, the carbon tube 4 is enclosed by an induction coil 10 which consists of copper tubing in which a cooling liquid is circulated.

The glass covered wire 11 leaving the carbon tube is wound on a reel 12 which has a large periphery with respect to the diameter of the wire.

The dimensions of the carbon tube controlling its electric resistance are so chosen that inside the tube a temperature is maintained which is as high as possible and which should not be more than 500° C. below the softening range of the glass or ceramic material of the capillary tube 2. The rate of passage of the capillary tube should be slow enough to ensure that the enclosed metal core has assumed the temperature obtaining inside the tube when the capillary passes the zone of the perforated tube walls.

The generator 13 produces in the induction coil 10 a high frequency electromagnetic alternating field which enters, and acts in the inside of the tube 4, through the slots 7. Said field produces eddy currents in the metal core 1 of the capillary tube 2, which currents heat the metal core.

The strength and frequency of the alternating field must be sufficient to produce in the metal core the heat required to exceed the melting point of the metal or alloy. As said melting point is in the upper range of the softening interval of the glass capillary or higher, the capillary is heated beyond the temperature obtaining inside the carbon tube by the heat radiated from the metal core melting in the alternating field; therefore, the temperature of the glass capillary will exceed the lower limit of the softening range.

The glass capillary together with the molten metal core is drawn in the zone of the inductive heating. The web 14 remaining between the slots 7 prevents an excessive decrease of the ambient temperature in said zone. We prefer to make the outer tube diameter in said zone larger than in the other parts of the tube to ensure a homogenous resistance heating of the tube.

The glass envelope as well as the metal core, which is at first still liquid, start solidifying in the lower part of the carbon tube. However, the radiated heat in said part prevents a too fast solidification which otherwise could take place because the drawn fine wire does no longer take up high frequency energy.

While we have described our method and device in connection with the manufacture of glass or ceramic fine wires of high melting metals, it should be understood that it may also be advantageously applied to the manufacture of such wires of metals having relatively low melting points. In such cases, the heating device has the advantage of a very short length which is useful for starting materials having a thickness of several millimeters or even centimeters.

The modification of the invention shown in FIG. 2 comprises an unperforated carbon tube resistance furnace 16 immediately followed by a tube of a diamagnetic material 21, such as Alumina or Zirconia surrounded by an induction coil 20, energized by a generator 23. Otherwise, the general arrangement of the heating and drawing means is similar to that in FIG. 1.

We claim:

1. A method for heating capillary glass and ceramic tubes containing a metal core while such tubes are drawn out to glass and ceramic covered wires, said method comprising passing such tube first through a zone of radiating heat produced by electric resistance heating, and then passing the thus heated tube through a high frequency inductive heating zone, thereby melting said metal core and softening said tube, and then drawing said tube into a glass or ceramic covered wire.

2. The method as claimed in claim 1 wherein said high frequency inductive heating zone at least partially overlaps said zone of radiating heat.

References Cited

UNITED STATES PATENTS 3,227,032   1/1966   Upton.
3,258,314   6/1966   Redmond et al.

DONALL H. SYLVESTER, *Primary Examiner.*

R. L. LINDSAY, *Assistant Examiner.*